United States Patent [19]

Yamaguchi

[11] Patent Number: 4,852,678
[45] Date of Patent: Aug. 1, 1989

[54] VEHICLE BODY FRAME FOR MOTORCYCLE

[75] Inventor: Ken Yamaguchi, Hidakamachi, Japan

[73] Assignee: Honda Giken Kogyo Kabushiki Kaisha, Tokyo, Japan

[21] Appl. No.: 128,052

[22] Filed: Dec. 3, 1987

[30] Foreign Application Priority Data

Dec. 5, 1986 [JP] Japan ................. 61-289894
Dec. 17, 1986 [JP] Japan ................. 61-300721

[51] Int. Cl.$^4$ .......................................... B62K 11/04
[52] U.S. Cl. ................................. 180/219; 280/781
[58] Field of Search ..................... 180/219, 225; 280/281 R, 274, 781

[56] References Cited

U.S. PATENT DOCUMENTS

| | | | |
|---|---|---|---|
| 1,198,669 | 9/1916 | Schwinn | 180/219 |
| 4,139,072 | 2/1979 | Dawson | 280/281 R X |
| 4,347,909 | 9/1982 | Takemura | 180/219 |
| 4,363,375 | 12/1982 | Kamiya | 180/227 |
| 4,480,712 | 11/1984 | Inoue | 180/219 |
| 4,638,881 | 1/1987 | Morioka | 180/219 |
| 4,684,144 | 8/1987 | Tanaka | 280/281 R |
| 4,696,363 | 9/1987 | Enda | 180/219 |
| 4,721,179 | 1/1988 | Yamaguchi | 180/219 |

FOREIGN PATENT DOCUMENTS

| | | |
|---|---|---|
| 60-4870 | 2/1985 | Japan . |
| 61-6084 | 1/1986 | Japan . |
| 61-160375 | 7/1986 | Japan . |
| 330309 | 6/1930 | United Kingdom ........... 180/219 |

*Primary Examiner*—Charles A. Marmon
*Assistant Examiner*—Brian L. Johnson
*Attorney, Agent, or Firm*—Birch, Stewart, Kolasch & Birch

[57] ABSTRACT

A vehicle body frame for a motorcycle for mounting a front fork, an engine and a rear fork includes a front frame having a right front frame member and a left front frame member. The right and left front frame members being secured relative to each other to form a support for a front fork of a motorcycle and being spaced relative to each other to form an interior portion for retaining an engine therebetween. A rear frame includes a right rear frame member and a left rear frame member. The right and left rear frame members being secured relative to each other to form a support for a rear fork of a motorcycle and to form an interior portion for retaining an engine therebetween. The front frame member and the rear frame member are secured to the engine for forming the motorcycle body frame with the engine being one of the elements of the body frame.

16 Claims, 13 Drawing Sheets

PRIOR ART

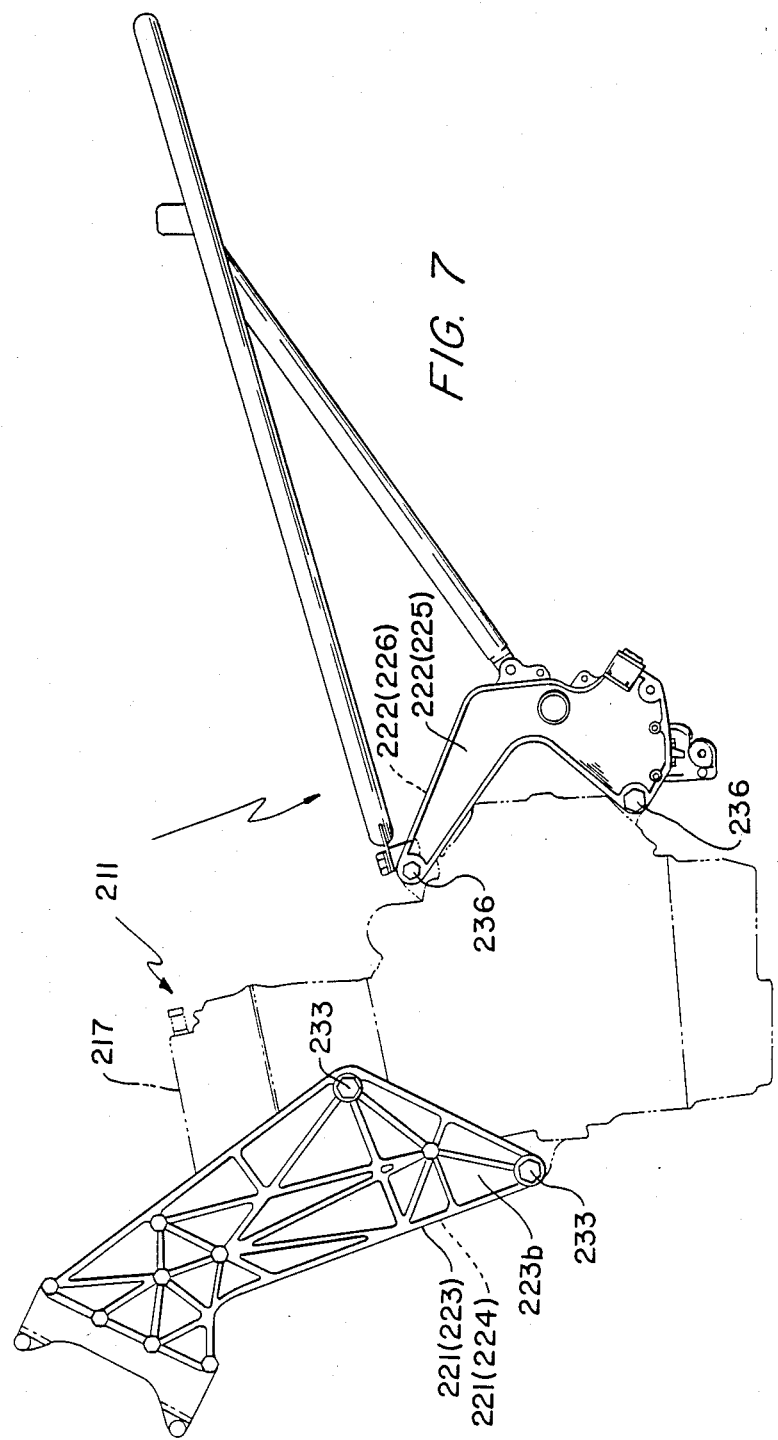

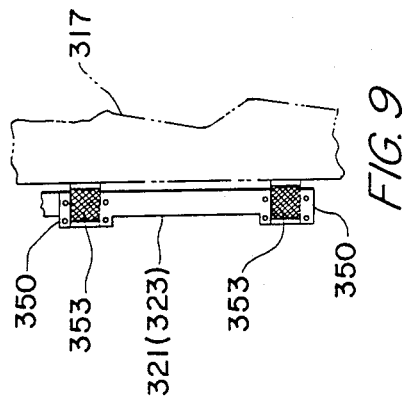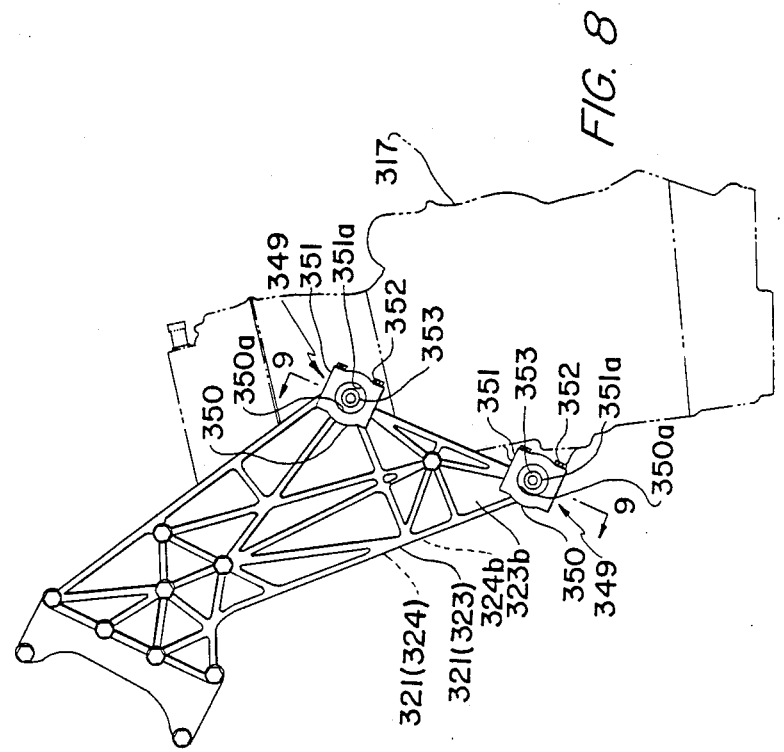

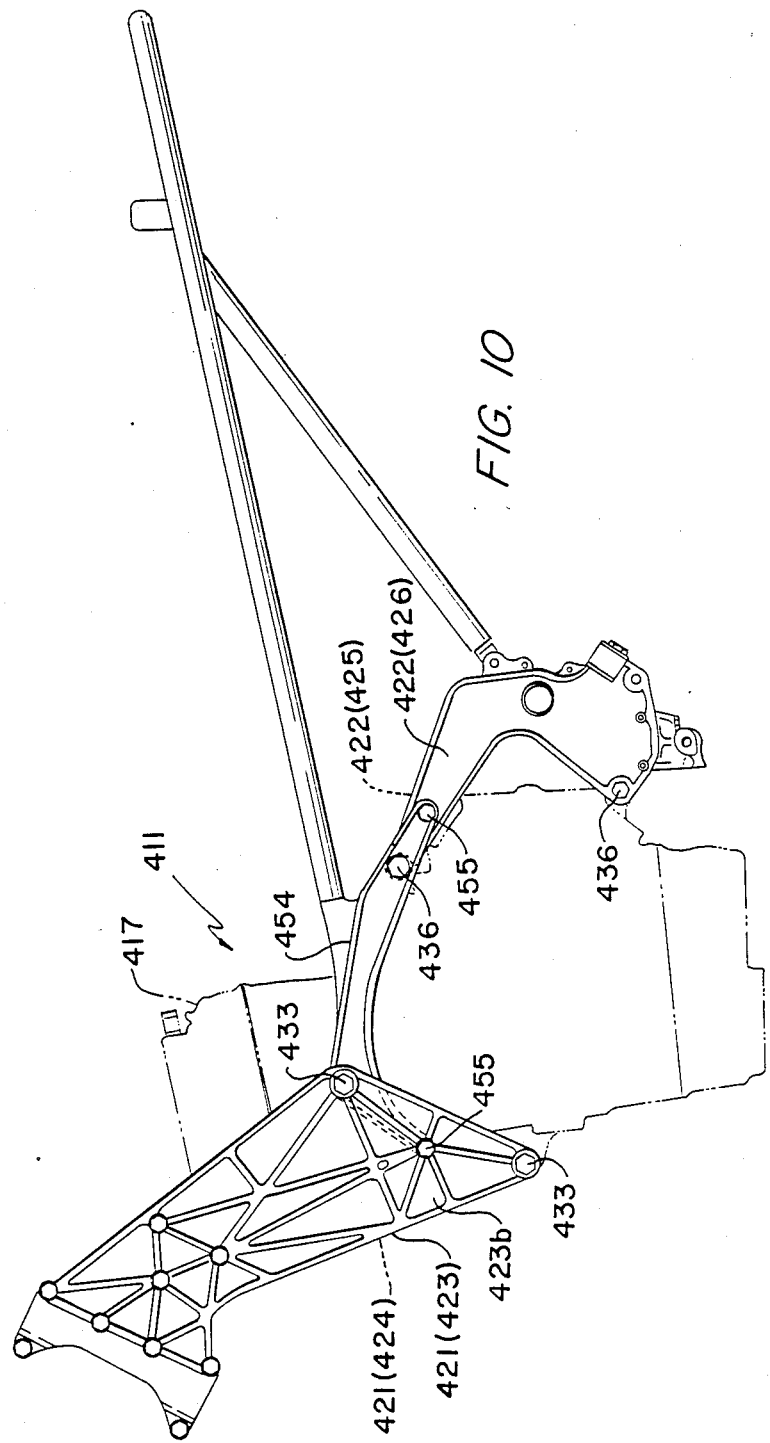

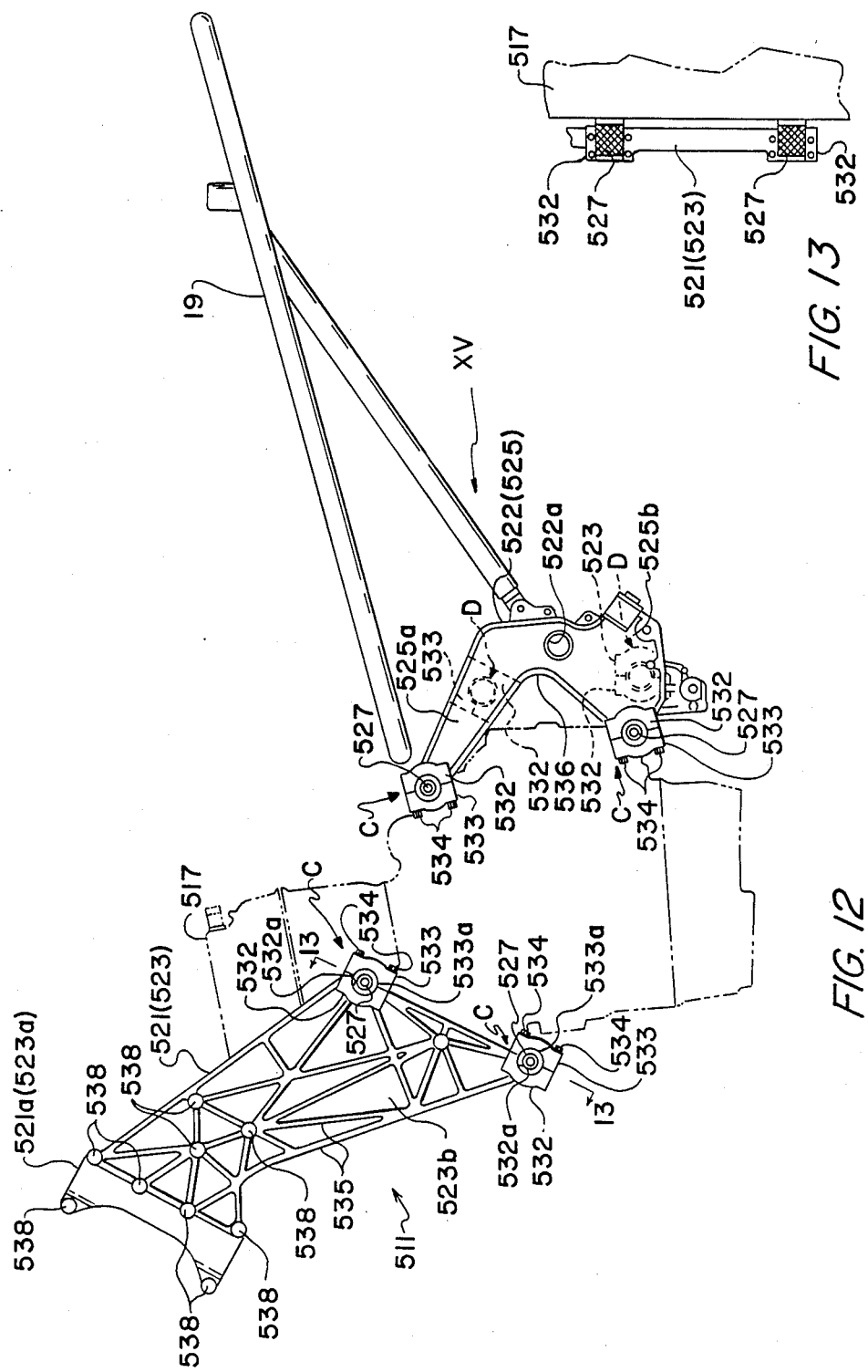

VEHICLE BODY FRAME FOR MOTORCYCLE

BACKGROUND OF THE INVENTION

1. Field of the Invention

The present invention relates to a vehicle body frame for a motorcycle.

2. Description of Background Art

Generally, a structure as shown in FIG. 1 is available as a vehicle body frame for a motorcycle.

The vehicle body frame, as illustrated in FIG. 1, includes a head pipe 2 for rotatably mounting a front fork on which a front wheel is supported. A pair of main frames 3 extend from the head pipe 2 along each side of a vehicle body. Down tubes 4 extend from the head pipe 2 along each side of the vehicle body and downwardly of the main frames 3. On the main frames 3 positioned on the opposite side of the head pipe 2 are provided a pivot portion 3a for mounting a rear fork thereon and an engine mount 3b for mounting an engine thereon. Each of the down tubes 4, as well as the main frames 3, includes an engine mount 4a for mounting the engine thereon.

The body frame 1 is constructed by welding and connecting the head pipe 2 with each of the main frames 3 and each of the down tubes 4 with the other component elements.

However, as described above, where each component element is constructed by welding, severe welding control will be required for preventing a base metal from being influenced by heat. The construction operation will become complicated because of the plurality of elements to be welded together.

One prior art teaching possible to cope with the above disadvantages is set forth in Japanese Laid-open Publication No. 61-6084.

In this publication, the body frame is constituted by a pair of divided frames having a shape divided in two along the longitudinal axis of the vehicle body. Each of the divided frames is formed by casting. The frames are brought into a face-to-face contact from each lateral side of the vehicle body and connected to each other by a bolt, thereby constructing the body frame. In addition, the frames form an interior space for mounting an engine or the like.

In the Japanese Publication No. 61-6084, almost all of the body frame is formed by the two members. The members are connected to each other by means of a bolt so that welding portions may be considerably reduced.

On the other hand, in this type of body frame, the following method is employed for mounting the engine within the interior space. Namely, holes for bolts are formed in plural positions on the lateral sides of the engine to be mounted. Bolt insertion holes extending along the lateral direction of the vehicle body are provided in plural portions of the body frame which correspond to the bolt holes of the engine. When assembling, the engine is inserted between the body frames and the lateral sides thereof are brought into contact with the inside surfaces of the body frame. The bolt holes of the engine are registered in position with the bolt insertion holes of the body frame. Then, connecting bolts are inserted into each bolt insertion hole and tightened up within each bolt hole. Thus, the inside surfaces of the body frame are firmly engaged with the lateral sides of the engine to cause a friction force therebetween which serves for preventing slip or slide between the engine and the body frame when an external force acts on the body frame.

OBJECTS AND SUMMARY OF THE PRESENT INVENTION

The present invention is intended to overcome disadvantages of the above-referred to prior art.

More specifically, a disadvantage occurs when each divided frame is integrally casted by die casting. A considerably large die and large scale equipment for such die casting are required because the body frame has substantially the same length as the distance between the front and rear wheels of the motorcycle. The larger the size of the vehicle body, the more remarkable the above disadvantage appears.

On the other hand, the directions of a load acting on the connected portions between the body frame and the engine are generally forward and rearward to the right and left or upward or downward of the vehicle body. In the above-mentioned engine mounting method, the contact surfaces between the body frame and the engine exist along the longitudinal direction of the vehicle body which corresponds to the direction of a load mentioned above. Further, the friction force as a resistance against slip or slide is generated through a connecting force by only one connecting bolt per one connection. Accordingly, this method has such a disadvantage that, when an excessive force acts on the body frame, some slip or slide will be caused at the connected portions of the body frame with the engine.

Method to Resolve Disadvantage

The present invention has for its object the provision of providing a vehicle body frame for a motorcycle which effectively overcomes the disadvantages described above.

To accomplish a first embodiment of the present invention, the vehicle frame for the motorcycle extends along each lateral side of the vehicle body in the longitudinal direction thereof for mounting thereon a front fork, an engine and a rear fork. A front frame extends forwardly of the vehicle body from the engine and is formed with a support for the front fork. A rear frame extends rearwardly of the vehicle body from the engine and is formed with a support for the rear fork. The front and rear frames are connected to each other in the longitudinal direction of the vehicle body. The front frame and the rear frame include a pair of right and left front frame structures and a pair of right and left rear frame structures, respectively. Each pair of which are divided into two pieces in the lateral direction of the vehicle body. Further, the front frame and the rear frame are connected to each other either directly or indirectly, namely, through the intermediary of the engine therebetween.

To accomplish another object of the present invention according to a second embodiment, the vehicle body frame for the motorcycle, according to the present invention, extends along each lateral side of the vehicle body in the longitudinal direction thereof for mounting thereon a front fork, an engine and a rear fork. A front frame extends forwardly of the vehicle body from the engine and is formed with a support for the front fork. A rear frame extends rearwardly of the vehicle body from the engine and is formed with a support for the rear fork. The front and rear frames are connected to each other in the longitudinal direction of the vehicle body. The front frame and the rear frame include a pair of right and left front frame members divided along the longitudinal axis of the vehicle body, and a pair of right and left rear frame members divided along the longitudinal axis, respectively. Each of the frame members is provided with two clamp means for attachment to a boss which is integrally provided on the lateral side of the engine.

As the vehicle body frame for the motorcycle of the present invention is constructed as described above, the component elements for the frame are formed by four members so as to enable the employment or application of the integral forming technique by casting of the respective component elements as well as to employ a mechanical connecting method. Accordingly, welding portions may be diminished in construction of the body frame. Further, a die in use for the die casting of the component elements may be reduced in size as small as possible.

In addition, in a second embodiment, the contact surfaces at the connected portions between the engine and the body frame are crossed as far as possible with respect to the direction of the external force which acts on the vehicle body. The connecting means, such as a connecting bolt used for the respective connected portions, are increased so that the resistance against the slip or slide between the engine and the body frame at each of the connected portions is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a side elevational view of the body frame showing the second embodiment of this invention;

FIG. 8 is a side elevational view showing a part of the body frame according to a third embodiment of the invention;

FIG. 9 is a rear elevational view taken along lines 9-9 of FIG. 8;

FIG. 10 is a side elevational view showing a part of this invention;

FIG. 12 is a side elevational view of a body frame;

FIG. 13 is a sectional view taken along line 13-13 in FIG. 12;

DETAILED DESCRIPTION OF THE PREFERRED EMBODIMENTS

The first embodiment of the present invention will be explained with reference to FIGS. 2 through 6.

Figure 1:
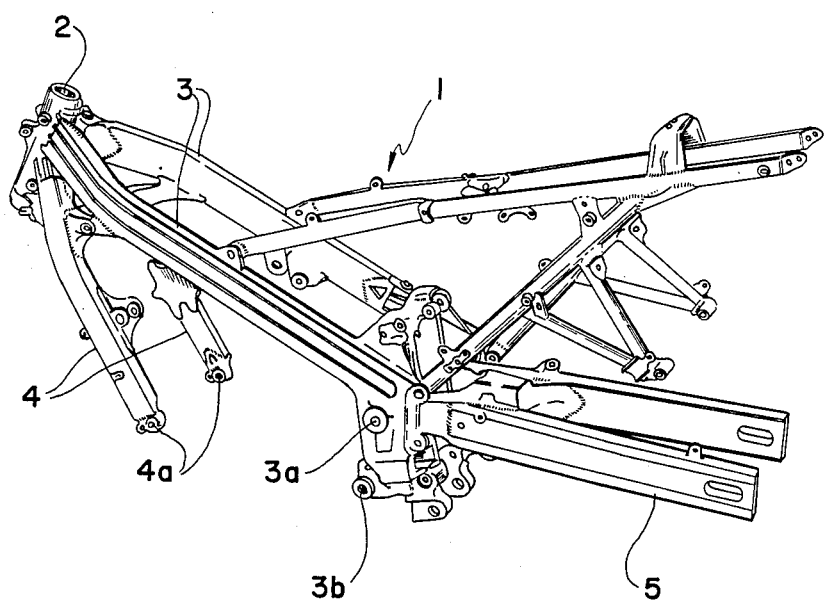
FIG. 1 is a perspective view showing an example of a conventional vehicle body frame.
Figure 2:
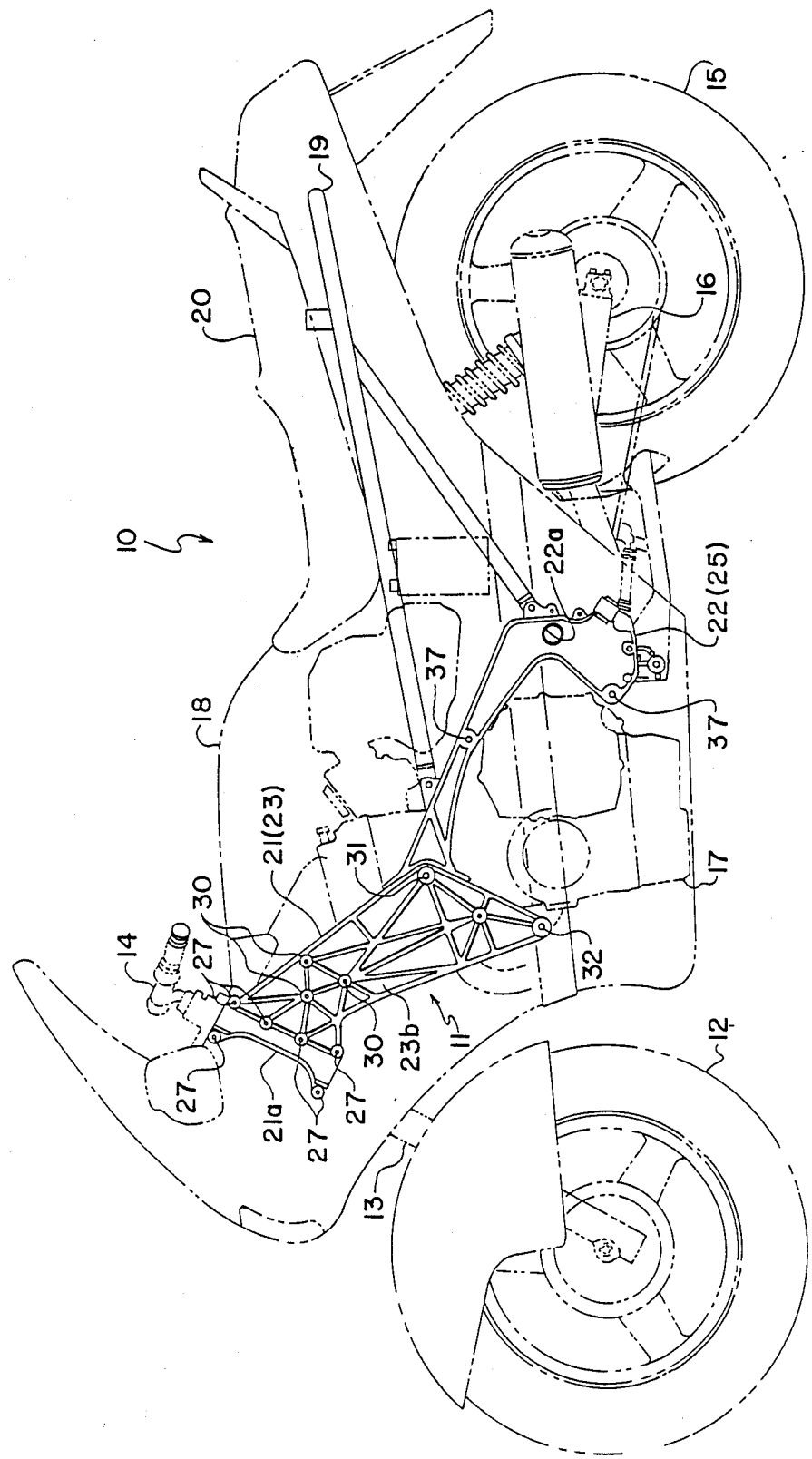
FIG. 2 is a side elevational view showing an outline of a motorcycle to which the first embodiment is applied.

In FIG. 2, a motorcycle 20 comprises a vehicle body frame 11, a front fork 13 rotatably mounted on the front portion of the body frame 11 in order to support a front wheel 12, a steering handle 14 integrally installed in the front fork 13 and a rear fork 16 pivotally mounted on the rear portion of the body frame 11 in order to support a rear wheel 15. An engine 17 is mounted substantially in the middle of the body frame 11 in the longitudinal direction of the vehicle. A fuel tank 18 is arranged above the engine 17 with a seat rail 19 extending from the body frame 11 toward and above the rear wheel 15. A seat 20 is mounted on the seat rail 19.

When explaining the body frame 11 according to the first embodiment, the body frame is constituted by connecting in a longitudinal direction thereof a front frame 21 and a rear frame 22 to each other. The front frame 21 extends from the engine 17 forwardly of the vehicle body and is formed with a support 21a for the front fork 13. The rear frame 22 extends from the engine 17 rearwardly of the vehicle body and is formed with a support 22a for the rear fork 16. The front frame 21 and the rear frame 22 comprise a pair of right and left front frame structures 23, 24 and a pair of right and left rear frame structures 25, 26, each pair of which are formed by being divided into two pieces in the lateral direction of the vehicle body.

Figure 3:
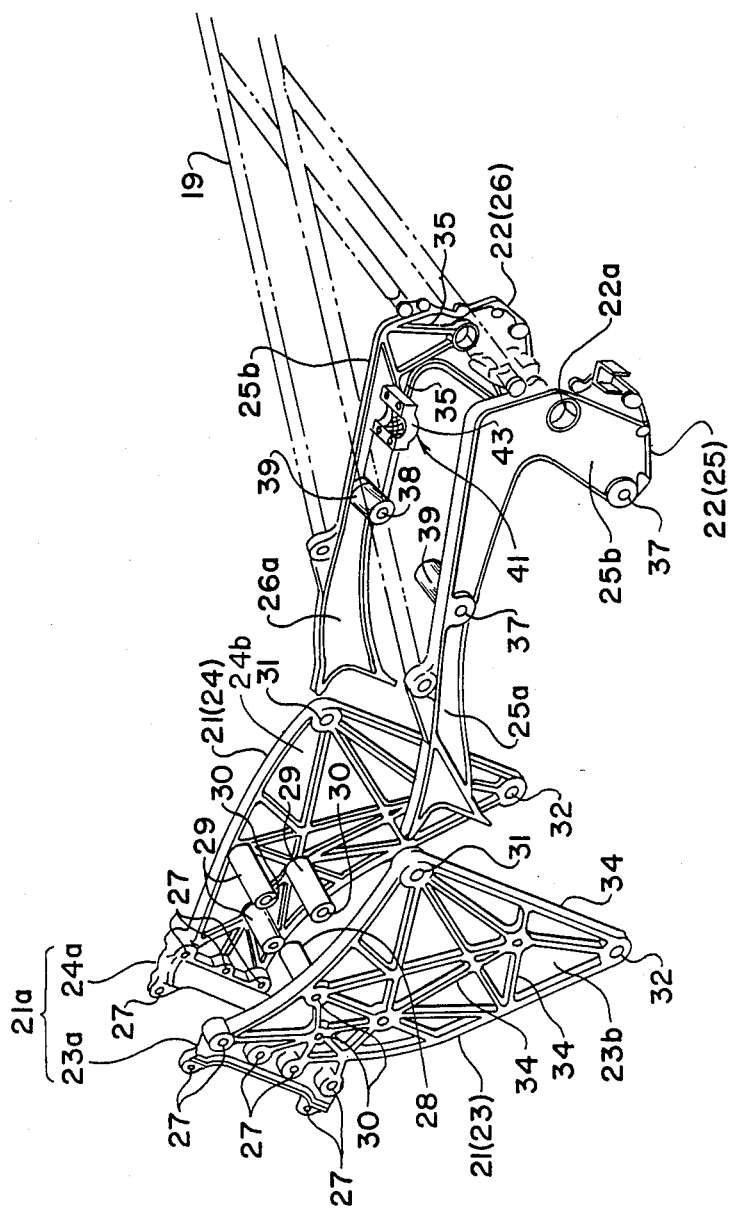
FIG. 3 is an exploded perspective view of a vehicle body frame.
Figure 4:
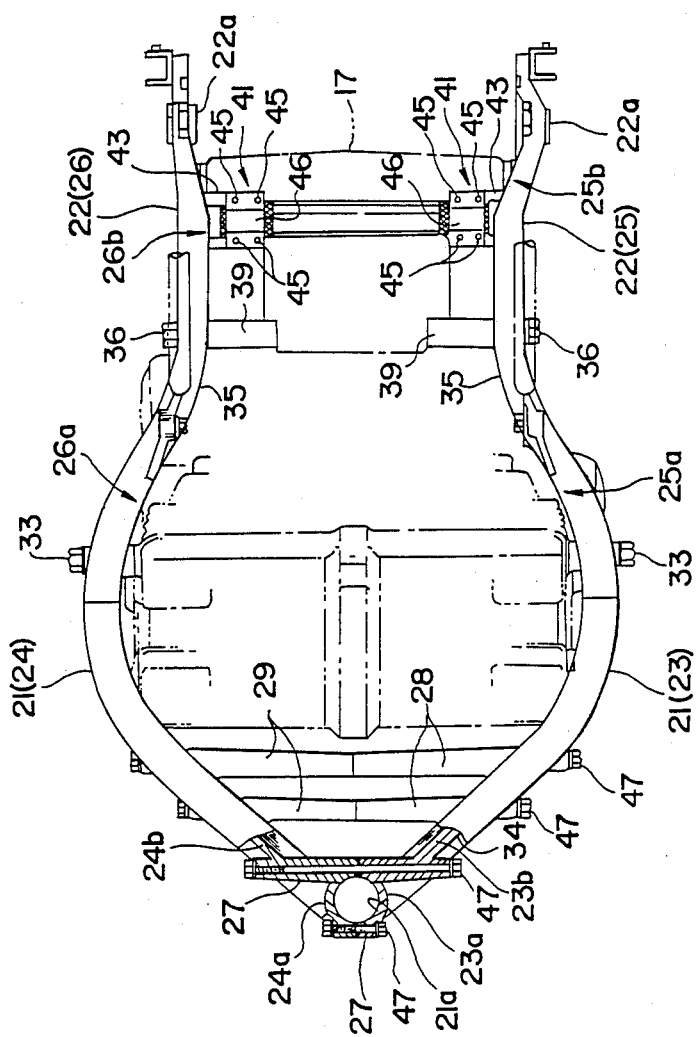
FIG. 4 is a top plan view of the body frame.

In more detail, the right and left front frame structures 23, 24 are connected to each other in a face-to-face contact relationship from each lateral side of the vehicle body so as to form the front frame 21. As shown in FIGS. 3 and 4, each of the structures is formed with a semicircular cylindrical portion 23a, 24a and a rectangular plate portion 23b, 24b. The semicircular cylindrical portions 23a, 24a are provided at the forward end of the vehicle body thereby to constitute the support 21a for the front fork 13. The rectangular plate portions 23b, 24b extend integrally from the semicircular cylindrical portions 23a and 24a rearwardly and downwardly of the vehicle body and project in a curved shape laterally and outwardly of the vehicle. Thus, the plate portions 23b, 24b constitute a main frame and a down tube in a conventional motorcycle frame.

On the semicircular cylindrical portions 23a, 24a of the respective front frame structures 23, 24 are provided bolt insertion holes 27 which are bored in the direction across the vehicle body in the face-to-face direction of the semicircular cylindrical portions 23a, 24a. A plurality of bosses 28, 29 for positioning are integrally projected along the direction across the vehicle body on the inside walls, facing sides, of the plate portions 23b, 24b. The bosses 28, 29 are adjacent to the semicircular cylindrical portions 23a, 24a. Bolt insertion holes 30 are formed passing through the bosses 28, 29 and the plate portions 23b, 24b.

In the above construction, the interval between the respective front frame structures 23, 24 may be regulated in such a manner that each of the bolt insertion holes 27, 30 formed in the front frame structures 23, 24 is connected to each other in a face-to-face condition thereof and that each boss 28, 29 is brought into contact with each other.

Figure 5:
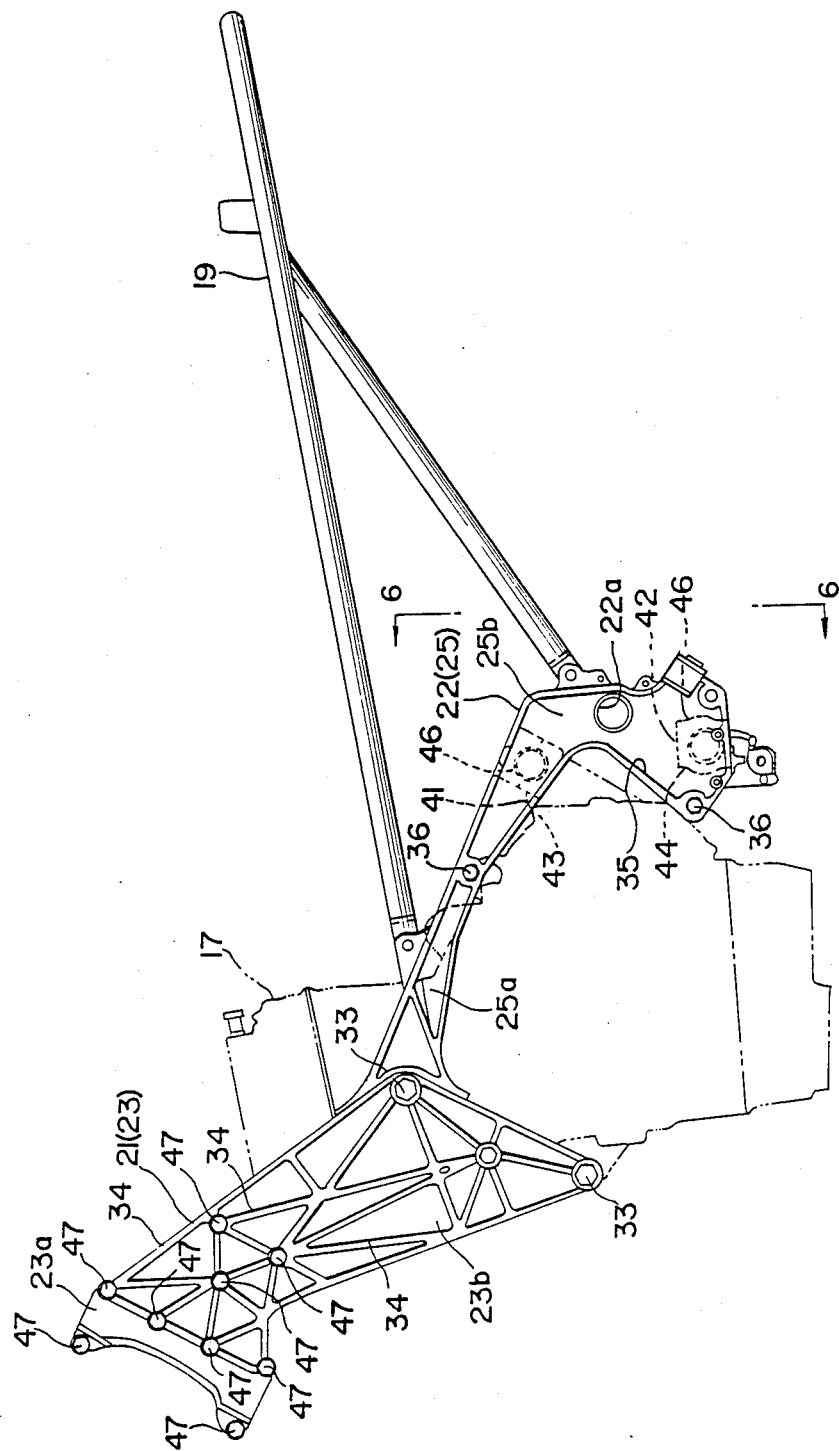
FIG. 5 is a side elevational view of the body frame.

As shown in FIGS. 2 and 3, a plurality of through bores 31, 32 substantially in parallel with the bolt insertion holes 27, 30 are formed at predetermined intervals on an opposite end to the semicircular cylindrical portions 23a, 24a of the plate portions 23b, 24b. Namely, the through bores 31, 32 are formed on the rearward end thereof which faces to the engine 17. Through the through bores 31, 32, as shown in FIGS. 4 and 5, engine mounting bolts 33 are inserted and tightened relative to the engine 17.

Further, on either side of each front frame structures 23, 24, reinforcement ribs 34 are projectingly formed in parallel with the axes of the bolt insertion holes 27, 30 and the through bores 31, 32 at the peripheral edges of the structures and in such a way as to connect the peripheral edges with the bolt insertion holes 27, 30 and the through bores 31, 32 to form the front frame structures 23, 24.

The respective rear frame structures 25, 26 are formed in a plate shape with integral reinforcement ribs 35 on either side surface thereof. The structures 25, 26 are also formed substantially in an L-shaped configuration with joint portions 25a, 26a which extend toward the front frame structures 23, 24 and with pivot portions 25b, 26b having a through hole provided to permit a pivot shaft (not shown) of the rear fork 16 to pass therethrough so as to constitute the support 22a.

Figure 6:
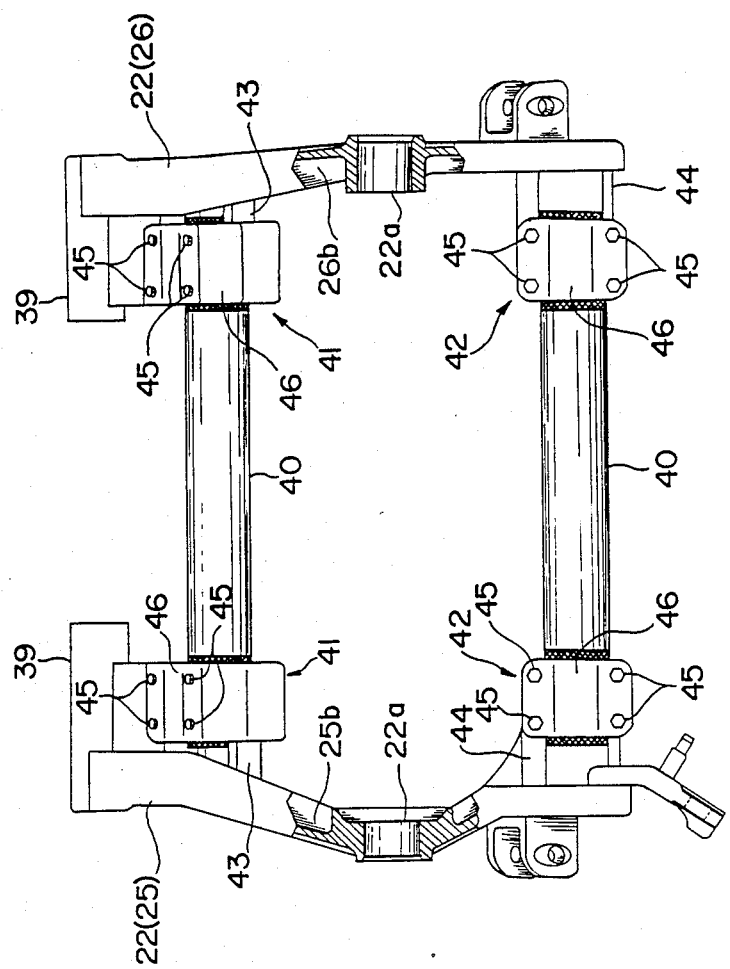
FIG. 6 is a rear elevational view, partially in section and partially omitted, taken along line 6-6 in FIG. 5.

On the forward side of the pivot portions 25b, 26b, through bores 37 are formed at the two portions to permit engine mounting bolts 36 to be inserted therethrough. Also, on the inside surfaces, bolt insertion holes 38 are provided to communicate with the through bores 37. Bosses 39 for coming into contact with the lateral side of the engine 17 are integrally formed along the direction across the vehicle body. As illustrated in FIGS. 4 and 6, clamps 41, 42 are also provided to mount thereon a cross pipe 40 for connecting the respective rear frame structures 25, 26 to each other.

As illustrated in FIGS. 4 and 6, the clamps 41, 42 comprise holders 43(44) each with a semicircular concave portion formed integrally on the pivot portions 25b, 26b. Caps 46 are provided with semicircular concave portions shaped in the same manner as the holders 43(44) and which are adapted to be fastened with the holders 43(44) by bolts 45 to thereby fixingly hold the cross pipe 40.

Thus, the projected directions of the reinforcement ribs 35 and the axes of the through bores 37, the bolt insertion holes 38, the bosses 39 and holders 43, 44 are formed generally in parallel with each other.

The constructed right and left front frame structures 23, 24 and right and left rear frame structures 25, 26 are made by die casting and are assembled by being connected with each other in either longitudinal or lateral directions of the vehicle body.

Namely, the respective rear frame structures 25, 26 are welded at the front ends of the joint portions 25a, 26a thereof to the rearward ends of the plate portions 23b, 24b formed on the front frame structures 23, 24. Thus, the left front frame structure 23 is connected with the left rear frame structure 25, and the right front frame structure 24 is connected with the right rear frame structure 26. Thereafter, the connected halves are brought into contact with each other from each lateral side of the vehicle body thereby to connect the pair of front frame structures 23, 24 by the connecting bolts 47 inserted into the respective bolt insertion holes 27, 30. On the other hand, the pair of the rear frame structures 25, 26 are connected by the clamps 41, 42 affixed to the cross pipes 40 bridged between the clamps 41, 42 of the respective rear frame structures 25, 26. Thus, the frame is constructed as illustrated in FIG. 4.

The frame body 11, as illustrated in FIG. 4, is formed at the forward portion thereof with the cylindrical support 21a by the pair of the semicircular cylindrical portions 23a, 24a of the front frame structures 23, 24. In the interior portion of the frame 11, the bosses 28, 29 of the front frame structures 23, 24 are connected with each other. The cross pipes 40 are fixedly secured between the rear frame structures 25, 26. In such a way as described above, intervals between each of the front frame structures 23, 24 and between each of the rear frame structures 25, 26 are regulated so as to form therebetween an interior portion for mounting the engine 17 and other accessories thereof.

The front fork 13 is rotatably installed on the forward support 21a of the body frame 11. The engine 17 is mounted within the interior portion thereof by the engine mounting bolts 33, 36 which are inserted in the through bores 31, 32 of the front frame structures 23, 24 and in the through bores 37 of the rear frame structures 25, 26. The rear fork is pivotably carried on the rearward support 22a of the frame 11 by inserting the pivot shaft (not shown) into the support 22a.

As explained above, as the body frame 11 according to the first embodiment is formed with four members comprising the right and left front frame structures 23, 24, and the right and left rear frame structures 25, 26, each of the members may be reduced in size and therefore the die used for die casting the four members may be small in size.

Further, the support 21a for the front fork 13, the mount portions for the engine 17 and the support 22a for the rear fork 16 are integrally forward of the four members in an allotted condition. The connection of the four members are performed by bolts except that the connection between the front frame structures 23(24) and the rear frame structures 25(26) is formed by welding. Accordingly, welding portions may be diminished to a large extent and the control or management required for assembling the body frame 11 may be simply directed to a fastening torque for the bolts so as to obtain a great improvement in productivity and in quality.

As illustrated in FIGS. 2 and 5, in the first embodiment the welded portions are located close to the center of gravity of the vehicle which is positioned at the cylinder of the engine 17. Thus, the torsional moment acting on the welded portions is low thereby ensuring a sufficient rigidity at the welded portions.

Furthermore, the axes of the bolt insertion holes 27, 30, the bosses 28, 29 and the through bores 31, 32 as well as the projected direction of the reinforcement ribs 34 in the front frame structures 23, 24 are formed substantially in parallel with each other. Similarly, the axes of the through bores 37, the bolt insertion holes 38, the bosses 39 and the concaves of the holders 43, 44 as well as the projected direction of the reinforcement ribs 35 in the rear frame structures 25, 26 are formed substantially in parallel with each other. Therefore, in the case of die casting each frame structures 23, 24, 25, 26, a simple split or segment die may be used.

A second embodiment will be explained with reference to FIG. 7. In the second embodiment, a vehicle body frame 211 is formed independently with a front frame 221 and a rear frame 222 which are constituted respectively with a pair of front frame structures 223(224) and a pair of rear frame structures 225(226). The pairs of the structures are connected through the intermediary of an engine 217 arranged therebetween. The connection is achieved by engine mounting bolts 233, 236.

The construction other than the above-described is similar to the first embodiment and, therefore, will not be explained any further.

According to the above construction, the rear frame structures 225, 226 are not provided with joint portions 25a, 26a as in the first embodiment. The rear frame structures 225, 226 may be smaller in size and the die, available for die casting the rear frame structures 225, 226, and the incidental equipment therefore may be reduced in size. Also, the quality control may be simplified because the connection by welding is eliminated.

Though the engine 217 constitutes a part of the body frame 211 together with the front frame structures 223, 224 and the rear frame structures 225, 26, no difficulties will arise because the engine 217 provides a high rigidity in itself.

FIGS. 8 and 9 illustrate a third embodiment in accordance with the present invention. In this embodiment, a front frame 321 includes clamps 349 which are substantially the same as the supporting structure for the cross pipe 40 between the aforesaid rear frame structures 25, 26. The clamps 349 are employed for the connections between the front frame structures 323, 324 as well as the rear frame structures 25, 26 and the engine 317.

Although FIGS. 8 and 9 only show the connecting relations between the front frame structures 323, 324 and the engine 317, it is to be understood that the same method is adopted between the rear frame structures 25, 26 and the engine 317.

In detail, the clamps 349 include holders 350 being integrally formed at the end close to the engine 317 on the plate portions 323b, 324b of the front frame structures 323, 324 and being provided with semicircular concaves 350a along the direction across the vehicle body. Caps 351 are mounted on the holders 350 to cover the concaves 350a and are formed with concaves 351a for forming through bores in cooperation with the concaves 350a. A plurality of bolts 352 are provided for fixedly securing the caps 351 to the holders 350.

The clamps 349 are adapted to connect the front frame structures 323, 324 (the rear frame structures 25, 26, not shown) with the engine 317 in such a way so as to be affixed to the bosses 353, which project from the lateral portions of the engine 317 from the radial direction thereof between the holders 350 and the caps 351.

The bosses 353 of the engine 317, as shown in FIG. 8, are provided therein with an axial bore for reducing weight and as seen in FIG. 9 with the outer periphery on which a roulette processing, knurling, is formed in order to prevent slip.

In such a construction as described above, the connecting force between the engine 317 and each frame structures 323, 324 (and rear frames 25, 26, not shown), may be enhanced, and the slip caused by the load acting on the vehicle body in the vertical, lateral and longitudinal directions and by the load in the torsional direction may be effectively restrained.

As a result, especially, as seen in the aforesaid second embodiment, in case of connecting the front frame 221 with the rear frame through the intermediary of the engine 217, the frame as a whole may be enhanced in its rigidity.

FIG. 10 shows a fourth embodiment of the present invention. A body frame 411 is provided with a pair of intermediate members 454 which are made by independently forming the joint portions 25a, 26a of the rear frame structures 25, 26 in the first embodiment. Each end of the intermediate members 454 is connected at two portions with each of front frame structures 423, 424 and rear frame structures 425, 426 by means of bolts 436, 455, whereby the front frame structures 423, 424 and the rear frame structures 425, 426 are connected so as to constitute the body frame 411.

In the fourth embodiment, each intermediate member 454 is tightened at each one of its two connecting portions on an engine 417 in common with the front frame structures 423, 424 and the rear frame structures 425, 426 by engine mounting bolts 433, 436 and is connected at the other connecting portion thereof on the front frame structures 423, 424 and on the rear frame structures 425, 426 thereby preventing rotation relative to the frame structures 423, 424, 425, 426.

Further, the connected portions between each end of the intermediate member 454 and each frame structures 423, 424, 425, 426 are formed in substantially a half of the standard thickness, and the shapes of each connected portion are formed in such recessed configurations as corresponding to the shapes of the counterpart members to be connected. When connecting to each other, therefore, the respective members are fitted to each other so as to be maintained in the predetermined positions. In the connected condition, the lateral surfaces of the intermediate members 454 are made flush with the lateral surfaces of each frame structures 423, 424, 425, 426.

According to the above-described construction, the rigidity of the body frame is enhanced and the quality control becomes easy without the welding portions required in the first embodiment. Further, when mounting and dismounting the engine 417, the front frame 421 and the rear frame 422 are prevented from separating from each other thereby simplifying the mounting and dismounting operations of the engine 417.

As explained hereinbefore, the vehicle body frame for the motorcycle according to the present invention extends along each lateral side of the vehicle body in the longitudinal direction thereof for mounting thereon a front fork, an engine and a rear fork. A front frame extends forwardly of the vehicle body from the engine and is formed with a support for the front fork. A rear frame extends rearwardly of the vehicle body from the engine and is formed with a support for the rear fork. The front and rear frames are connected to each other in the longitudinal direction of the vehicle body. The front frame and the rear frame comprise a pair of right and left front frame members and a pair of right and left rear frame members, respectively. Each pair of members are divided into two pieces in the lateral direction of the vehicle body. Further, the front frame and the rear frame are connected to each other directly or indirectly through the intermediary of the engine therebetween.

The present invention provides a body frame including four members with a pair of front frame structures and a pair of rear frame structures. Each component elements may be reduced in size so as to enable the die used to die cast the elements to be reduced in size as small as possible. This results in flexible adaption to a trend toward a larger size for the frame body.

Further, the support of the front fork, them mount portions of the engine and the support of the rear fork are integrally formed in allotted conditions on the four members. When the four members are connected, almost all of the connections are made by use of bolts, thus considerably reducing the welding portions. Therefore, the control or management for the assembling operation of the body frame requires only an inspection of the fastening torque for the bolts. A lot of improvements in productivity and in quality may be obtained.

Figure 11:
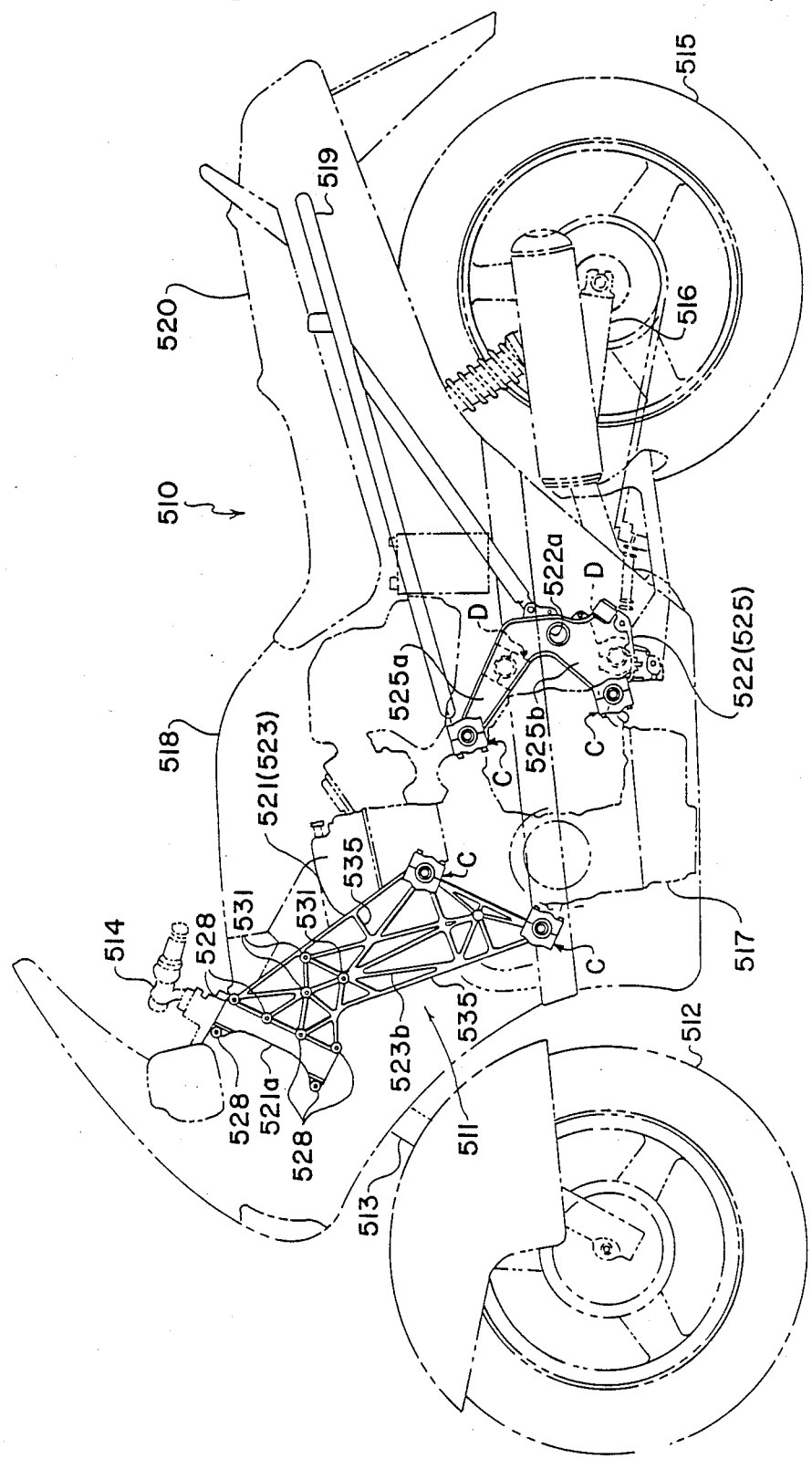
FIG. 11 is a side elevational view showing an outline of a motorcycle to which is applied a fourth embodiment of the present invention.

A fifth embodiment of the present invention will be explained hereunder, based on FIGS. 11-15. In FIG. 11, a motorcycle 510 includes a vehicle body frame 511, a front fork 513 rotatably mounted on the front portion of the body frame 511 so as to support a front wheel 512. A steering handle 514 is integrally installed in the front fork 513. A rear fork 516 is swingably mounted on the rear portion of the body frame 511 so as to support a rear wheel 515 therewith. An engine 517 is fitted on substantially the middle of the body frame 15 in the longitudinal direction of the vehicle. A fuel tank 518 is arranged above the engine 517. A seat rail 519 extends from the rear portion of the body frame 511 toward and above the rear wheel 515. A seat 520 is mounted on the seat rail 519.

When explaining the body frame 511 of the fifth embodiment, the body frame 511 comprises a front frame 521 and a rear frame 522. The front frame 521 is arranged to extend forwardly of the vehicle body from the engine 517 and is formed with a support 521a for the front fork 513. The rear frame 522 is arranged to extend rearwardly of the vehicle body from the engine 517 and is formed with a support 522a for the rear fork 516. The front frame 521 includes a pair of right and left front frame structures 523, 524 which are divided along the longitudinal axis of the vehicle body. The rear frame 522 includes a pair of right and left rear frame structures 525, 526 which are divided along the longitudinal axis, respectively. Each pair of frame structures 523 and 524, 525 and 526 are provided with clamp means C for fixedly holding bosses 527 in the radial direction thereof. The bosses 527 are integrally provided on the lateral sides of the engine 517.

More specifically, the right and left front frame structures 523, 524 are adapted to constitute the front frame 521 by being connected with each other from each lateral side of the vehicle body in a face-to-face condition. As shown in FIGS. 12 and 13, each half is formed with a semicircular cylindrical portion 523a or 524a and a rectangular plate portion 523b or 524b. The semicircular cylindrical portions 523a and 524a are formed at the forward end of the vehicle body thereby to constitute the support 521a for the front fork 513. The rectangular plate portions 523b and 524b extend integrally from the semicircular cylindrical portions 523a and 524a rearwardly and downwardly of the vehicle body and project in a curved shape laterally and outwardly of the vehicle body. Thus, the plate portions 523b and 524b constitute a main frame and a down tube in a conventional motorcycle.

Figure 14:
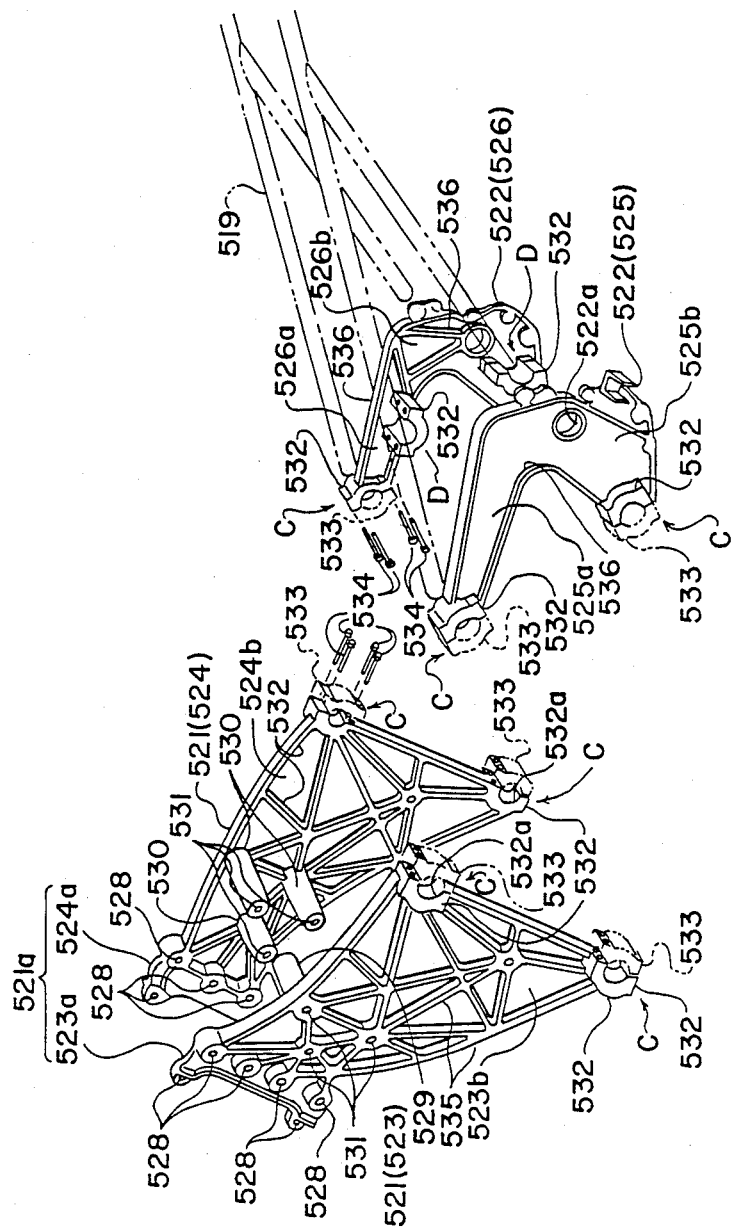
FIG. 14 is an exploded perspective view of the body frame.

On the semicircular cylindrical portions 523a and 524a of the respective front frame structures 523 and 524, as shown in FIG. 14, bolt insertion holes 528 are provided which are bored in the direction across the vehicle body, in the direction of the face-to-face contact of each of the front frame structures 523 and 524. A plurality of holes 528 are provided at predetermined intervals in the longitudinal direction of the semicircular cylindrical portions 523a and 524a. A plurality of positioning bosses 528 and 529 are integrally formed and project along the direction across the vehicle body on the inside wall of the plate portions 523b and 524b adjacent to the semicircular cylindrical portions 523a and 524a. Bolt insertion holes 530 are formed passing through the bosses 528 and 529 and the plate portions 523b, 524b.

In the above construction, the distance between the respective front frame structures 523 and 524 may be regulated in such a manner that each bolt insertion holes 528 and 532 formed in the front frame structures 523 and 524 are connected to each other in a face-to-face condition thereof and that each boss 529 and 530 is brought into contact with each other.

As shown in FIGS. 11 and 14, the clamps C are formed on the end opposed to the side where the semicircular cylindrical portions 523a and 524a are provided. More specifically, on the ends confronting to the engine 517 at the rearward end of the longitudinal direction of the front frame structures 523 and 524.

The clamps C are provided in the two portions per each front frame structure 523 and 524 in such a way that the clamps C correspond to the front side bosses 527 on the engine. The clamps C are integrally formed on the plate portions 523b and 524b of the front frame structures 523 and 524 and comprise holders 532 formed with semicircular concaves 532a extending along the lateral direction of the vehicle body. Caps 533 are mounted to cover the concaves 532a of the holders 532 and include concaves 533a forming through holes across the longitudinal direction of the vehicle body in cooperation with the concaves 532a. A plurality of bolts 534, four bolts in this embodiment, are provided for securing the caps 533 to the holders 532.

The clamps C are adapted to connect the front frame structures 523 and 524 with the engine 517 in such a way that the bosses 527 of the engine 517 are affixed at the radial direction thereof between the holders 532 and the caps 533.

Each of the bosses 527 projecting from the engine 517, as shown in FIG. 12, is provided therein with an axial bore for reducing weight. As illustrated in FIG. 23, the outer periphery of the bosses 527 include a roulette processing, knurling, which is provided to prevent slippage.

On either side of each front frame structure 523 and 524, as shown in FIG. 14, reinforcement ribs 535 are formed which are integral and project in parallel with the axes of the bolt insertion holes 527 and 530 at the peripheral edges of the structures and in such a way as to connect the peripheral edges with the bolt insertion holes 528 and 531.

As shown in FIG. 14, the respective rear frame structures 525 and 526 are formed in a plate shape with integral reinforcement ribs 536 on the either side surface thereof. The structures 525 and 526 are also formed substantially in an L-shaped configuration with joint portions 525a and 526a extending toward the front frame structures 523 and 524. Pivot portions 525b and 526b are provided with a through hole formed to permit a pivot axle (not shown) of the rear fork 516 to pass therethrough and for forming the supports 522a.

Figure 15:
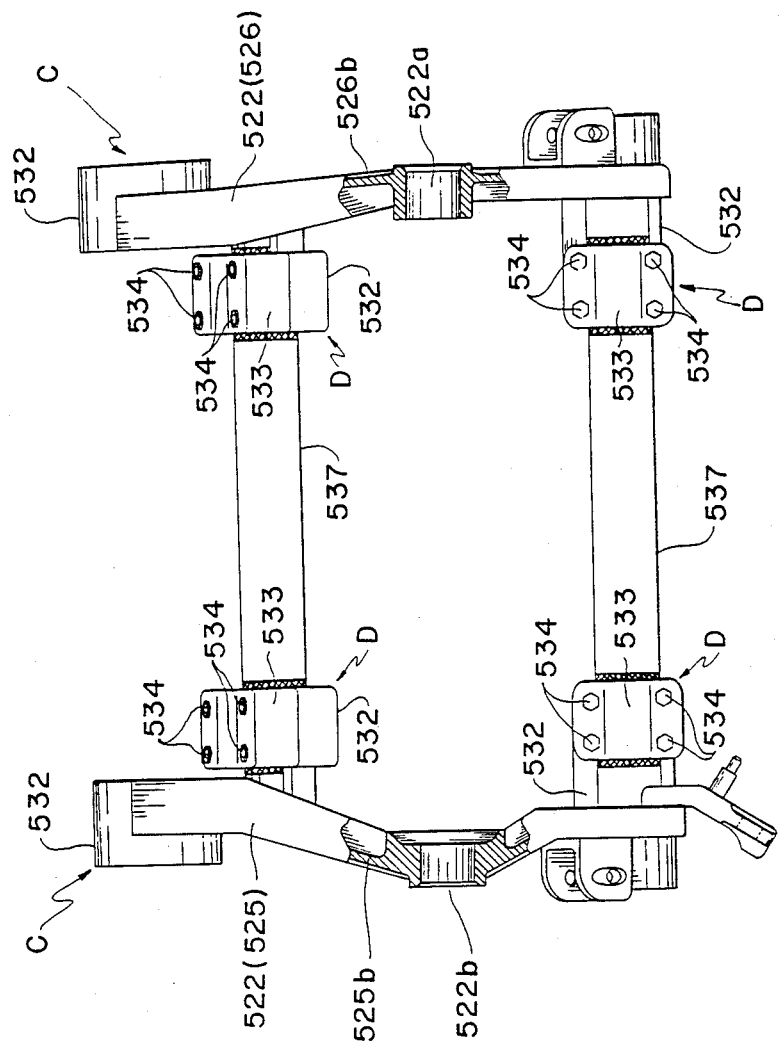
FIG. 15 is an enlarged schematic view in the direction of an arrow XV in FIG. 12.

As shown in FIGS. 11 and FIG. 14, clamps C are provided on the front frame structures 523 and 524 and are also provided on the front ends of the joint portions 525a and 526a and on the front lower ends of the pivot portions 525b and 526b. The rear frame structures 525 and 526 are installed through the clamps C onto the engine 517. On the inside walls of the rear frame structures 525 and 526, as shown in FIGS. 12 and 15, two clamps D, similar to the clamps C, are integrally provided at the predetermined upper and lower intervals and adapted to fixedly hold each end of cross pipes 537, bridging across between both rear frame structures 525 and 526 so as to connect to each other the rear frame structures 525 and 526. The structure of the clamp D will not be explained more in detail because it is similar to the clamp C and is illustrated with the same numeral.

The constructed right and left front frame structures 523 and 524 as well as right and left rear frame structures 525 and 526 are formed by die casting.

After contacting the pair of structures from each lateral side of the vehicle body, the pair of the front frame structures 523 and 524 are connected by the connecting bolts 538, which are passed through the respective bolt insertion holes 528 and 531 to thereby form the front frame 521. In a similar manner, the pair of the rear frame structures 525 and 526 are connected by bridging the cross pipe 537 between both clamps D formed on the structures 525 and 526 and by fixedly holding each end of the cross pipe 537 with the clamps D to thereby form the rear frame 522. Thereafter, the front frame 521 and rear frame 522 are connected to the front and the rear portions of the engine 517 by affixing the bosses 527 of the engine 517 with the clamps C of the frames so that the body frame 511, which includes the engine 517 as a component element, is constructed as shown in FIG. 12.

As shown in FIG. 11, the front fork 513 is rotatably mounted on the support 521a forwardly of the body frame 511. The rear side of the rear fork 516 is pivotably mounted in such a way as to insert the pivot axle (not shown) of the rear fork 516 into the support 522a formed on the rear frame 522.

As explained above, the body frame 511, according to the fifth embodiment, is formed with four members comprising the right and left front frame structures 523 and 524 and the right and left rear frame structures 525 and 526. Each of the members may be reduced in size and, therefore, the die which is used for die casting these members, may be reduced in size.

The support 521a of the front fork 513, the mount portions of the engine 517 and the support 522a of the rear fork 516 are integrally formed on the four members in an allotted condition on the members. The connection of the four members are performed only by the bolts. Thus, the control or management required for assembling the body frame 511 may be simple and directed only to a fastening torque for the bolts so as to obtain a significant improvement in productivity and in quality.

Further, in the fifth embodiment, each of axes of the bolt insertion holes 528 and 531 and in the bosses 529 and 530 in the front frame structures 523 and 524 and in the rear frame 522 as well as the projected directions of the reinforcement ribs 535 and 536 extend substantially in parallel with each other. Therefore, in case of die casting each frame structures 523, 524, 525, and 526, a simple split or segment die may be used.

The engine 517 constitutes a part of the body frame 511 together with the front frame structures 523 and 524 and the rear frame structures 525 and 526. No difficulties will arise because the engine 517 provides a high rigidity in itself.

Furthermore, as the connection between the engine 517, the front frame 521 and the rear frame 522 are performed by the bosses 527 formed on each lateral side of the engine 517 and the clamps C fixedly holding the bosses 527 in their radial directions, supporting surfaces are formed in crossed directions to a load which acts on the vehicle body in the longitudinal, lateral and vertical directions thereof or to a load in a torsional direction. Thus, a support is provided against loads in the above directions to eliminate slip or slide between the engine 517, the front frame 521 and the rear frame 522 as far as possible. Also, the connection between the holders 532 and the caps 533 is performed by the four bolts 534 at the connected portions between the engine 517 and the frames 521 and 522, thereby to maintain a sufficient connecting force on the connected portions and thus to enhance the slip preventing effect.

As a result, the body frame 511 as a whole may be enhanced in its rigidity. Preferred embodiments, dimensions, detailed configurations or the like of the component elements in the embodiments are given just as an example, as and various changes may be made according to the types or the design requirements of motorcycles to which the present invention is applied.

The body frame for the motor cycle according to the fifth embodiment of the present invention is arranged to extend along each lateral side of the vehicle body in the longitudinal direction thereof for mounting thereon a front fork, an engine and a rear fork. A front frame extends forwardly of the vehicle body from the engine and is formed with a support for the front fork. A rear frame extends rearwardly of the vehicle body from the engine and is formed with a support for the rear fork. The front and rear frames are connected to each other in the longitudinal direction of the vehicle body. The front frame and the rear frame include a pair of right and left front frame structures divided along the longitudinal axis of the vehicle body, and a pair of right and left rear frame structures, divided along the longitudinal axis, respectively. Each of the frame structures is provided with a clamp means affixed to a boss which extends in a radial direction. The boss is integrally provided on the lateral side of the engine. Accordingly, the vehicle body frame of the invention provides an excellent construction.

Because the vehicle body frame is constructed from four members including the right and left front frame structures and the right and left rear frame structures, the members may be constructed to be small in size. Thus, the die in use for die casting of each structure may be as small in size as possible. Thus, the present invention can easily cope with the trend toward a larger size for the body frame.

The support of the front fork, the mount portions of the engine and the support of the rear fork are integrally formed in allotted conditions on the four members. The connections between the four members and between the engine are all achieved with bolts. Thus, welding steps are eliminated. Therefore, the control or management required for assembling of the body frame may be simple and require only inspection of the fastening torque for the bolts. The present invention is an improvement in production and in quality.

The directions of the contact surfaces between the engine, the front frame and rear frame extend along the lateral direction of the vehicle body so as to cross the direction of a load acting on the vehicle body. When a connecting force at the connected portions occurs, a plurality of bolts are possible to be used. As a result, slip or slide between the engine and each frame which is caused by such load is prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A vehicle body frame for a motorcycle for mounting a front fork and a rear fork comprising:
   an engine;
   a pair of right front and left front frame members, said right and left front frame members being secured to each other and extending forwardly and upwardly relative to said engine and having a predetermined vertical width to form a support for a front fork of a motorcycle at each upper front end thereof and being spaced relative to each other to form an interior portion for retaining said engine therebetween;
   bosses being formed on an internal lateral wall of each of said pair of front frame members and projecting from said internal lateral wall to be contacted and connected to each other in face-to-face relation for forming a predetermined lateral interval therebetween;
   a rear frame including a right rear frame member and a left rear frame member, said right and left rear frame members being secured to each other to form a support for a rear fork of a motorcycle and to form an interior portion for retaining said engine therebetween;
   a fuel tank being positioned in an open space formed rearwardly of said front frame members and above said engine; and
   a seat rail mounted at a front end on each of said rear frame members and extending rearwardly of the rear frame members toward and above said rear fork;
   respective lower rear ends of said front frame members being secured on opposite sides of said engine at two spaced upper and lower portions and at said predetermined lateral interval and said rear frame members being secured to said engine for forming the motorcycle body frame with said engine being one of the elements of the body frame.

2. A vehicle body frame according to claim 1, wherein said front and rear frame members are secured to each other and to said engine by bolts.

3. A vehicle body frame according to claim 1, wherein said right front frame member and said right rear frame member are secured to each other and to said engine and said left front frame member and said left rear frame member are secured to each other and to said engine.

4. A vehicle body frame according to claim 1, and further including clamps affixed to said front frame member and to said rear frame member for securing said front and rear frame members to said engine.

5. A vehicle body frame according to claim 4, and further including bosses projecting from said engine, said clamps being secured to said bosses for affixing said front and rear frame members to said engine.

6. A vehicle body frame according to claim 1, and further including reinforcing ribs secured to each other for forming a framework for defining the front and rear frame members.

7. A vehicle body frame according to claim 6, and further including bosses affixed to said right rear frame member and said left rear frame member which engage one another when said right and left rear frame members are secured together to form said rear frame member.

8. A vehicle body frame according to claim 1, and further including a right intermediate frame member for connecting said right front frame member and said right rear frame member and a left intermediate frame member for connecting said left front frame member and said left rear frame member, said right and left intermediate frame members being secured to said front and rear frame members and to said engine by means of bolts.

9. A vehicle body frame according to claim 3, wherein said left front frame member and said left rear frame member and said right front frame member and said right rear frame member are secured to each other by welding.

10. A vehicle body frame according to claim 4, wherein each said clamp includes a holder portion and a cap portion secured to each other and to said engine by means of bolts.

11. A vehicle body frame according to claim 1, and further including reinforcement ribs formed on said rear frame members for increasing the strength of the body frame.

12. A vehicle body frame according to claim 1, wherein a plurality of holes are provided in said right front frame member and said left front frame member for securing the frame members together with a plurality of bolts.

13. A vehicle body frame according to claim 1, wherein a plurality of holes are provided in said right rear frame member and said left rear frame member for securing the frame members together with a plurality of bolts.

14. A vehicle body frame according to claim 1, and further including clamps disposed within the interior portion formed by said right and left rear frame members and a cross pipe for attachment to said clamps for securing said right and left rear frame members together.

15. A vehicle body frame according to claim 14, wherein two clamps are provided on said right rear frame member and two clamps are provided on said left rear frame member and two cross pipes are provided for attachment to respective clamps for securing said right and left rear frame members together.

16. A vehicle body frame according to claim 5, wherein said engine includes at least eight bosses projecting therefrom and each boss includes a knurled outer surface for preventing slip between each boss and each clamp mounted on the front and rear frame members.

* * * * *